United States Patent [19]

Bishop et al.

[11] Patent Number: 4,951,308
[45] Date of Patent: Aug. 21, 1990

[54] AUTOMATED VENDING OF CELLULAR HAND-HELD TELEPHONES AND CELLULAR TELEPHONE SERVICES

[75] Inventors: Ronald D. Bishop, Irvine; Dana W. McClure, El Toro; John A. Storch, Santa Ana, all of Calif.

[73] Assignee: Cellular Communications Corporation, Houston, Tex.

[21] Appl. No.: 291,944

[22] Filed: Dec. 29, 1988

[51] Int. Cl.⁵ ............................................. H04M 1/57
[52] U.S. Cl. ..................................... 379/91; 379/144; 235/381; 340/825.35
[58] Field of Search ...................... 379/91, 92, 144, 58, 379/63; 235/375, 379, 380, 381, 383, 385; 340/825.35; 368/401, 403

[56] References Cited

U.S. PATENT DOCUMENTS 4,803,348  2/1989  Lohrey et al. .................... 235/381

Primary Examiner—Robert Lev

[57] ABSTRACT

Mobile cellular telephone services are automatically vended through a microprocessor controlled vending machine which inventories a plurality of mobile cellular telephones and selectively delivers one of the phones after reading a credit card number from a customer and obtaining credit card approval. The mobile cellular telephone is dispensed and later returned by the customer. When returned by the customer, the mobile cellular telephone is disposed within a receiving unit which uniquely verifies the mobile cellular telephone through its phone number, reads the usage made by the customer of the mobile telephone, and senses the charged condition of the battery within the mobile telephone. The customer's credit card is again read and the bill for rental of the mobile cellular telephone unit, including all telephone usage charges, is computed and directly billed to the credit card number. The vending unit then produces a printed record of the credit card billing and returns the mobile telephone unit to inventory to be fully recharged and reinitialized for revending.

18 Claims, 3 Drawing Sheets

AUTOMATED VENDING OF CELLULAR HAND-HELD TELEPHONES AND CELLULAR TELEPHONE SERVICES

BACKGROUND OF THE INVENTION

1. Field of the Invention

The invention relates to the field of vending machines and the automatic vending of services, and in particular to the automated vending of mobile cellular telephone services and the rental of portable cellular radiotelephones.

2. Description of the Prior Art

Automated vending of a wide variety of articles has for many decades been well developed and well accepted in the market. The degree of complexity of the vending transaction has generally increased to where certain types of services, such as a restricted range of banking services, are also commonly transacted through automated vending machines.

In addition to the vending of purchased articles, or limited services, the art has devised automated vending machines which rent or lend articles such as rented video tapes. Such a unit is manufactured by Video Vendor, 4234 Main Street, Skokee, Ill. 60076. Such vending units are software driven through microprocessors and include various input and output devices such as a credit card reader and a paper printer. The video customer makes a selection of a video cassette by viewing the title of the cassette through a display window on the front of the unit. He iserts his credit card into the card reader, which reads the card and then makes the necessary credit checks. The microprocessor within the vending unit may comprise a stand-alone unit with its own internal memory, or be communicated through a modem by conventional telephone lines to a central computer office wherein credit checks are facilitated. Upon credit approval, the vending unit then mechanically fetches the selected video tape and dispenses it from the unit. A receipt is then printed and delivered by a microprocessor unit to the paper printer for memorializing the credit card transaction. The receipt is delivered to the customer and the credit card returned.

Later, the customer returns the video cassette to the vending unit which identifies the viedo cassette from a bar code affixed to the video cassette and returns it to its inventory. The appropriate rental charge is then debited to the customer and a final receipt issued. Typically, the rental charge varies depending upon the duration for which the cassette was rented, as well as the day of the week when the cassette was rented.

Although the prior art has devised a flexible system and methodology for renting articles, the transaction which is conducted is simply the lending of the article. No accounting is made in the lending transaction as to what usage is made of the article while it is lent. In the case of a cellular telephone, the charge to which the customer will be obligated, necessarily depends upon the number and type of telephone calls the customer has made while the telephone unit is rented to him. Furthermore, the telephone unit must be maintained and reinitialized for the next customer. This includes, for example, the recharging of the battery and clearing any internal memories within the telephone unit.

Furthermore, the nature of a telephone rental varies dramatically from prior art rental situations, such as with video cassettes, since the telephone unit is highly mobile and may be returned to a vending unit hundreds, if not thousands, of miles away from the unit from which it was originally rented. The ability to handle such trans-national rental transactions and to accommodate the foreign telephone number, which the returned telephone carries, all render the transaction not only more complicated but of a qualitatively different nature.

Therefore, what is needed is an apparatus and methodology whereby the limitations of prior art automated vending machines may be avoided and a vending machine and methodology for mobile cellular telephones provided.

BRIEF SUMMARY OF THE INVENTION

The invention is an apparatus for vending mobile telephones comprising a microprocessor, a bus coupled to the microprocessor, and a memory coupled to the microprocessor. An electromechanical storage mechanism is provided for holding a plurality of mobile telephone units. A dispensing circuit selectively dispenses one of the plurality of mobile telephone units from the storage mechanism. The dispensing circuit is electrically coupled to the bus and thence to the microprocessor memory. An input/output circuit is coupled to the bus for interactively communicating with the microprocessor to selectively control the dispensing circuit. A bus connection circuit is provided for electrically coupling to the plurality of mobile telephone units within the storage mechanism. The bus connection circuit is coupled to the bus and provides a means of allowing communication between the plurality of mobile telephone units and the microprocessor to determine the identity and usage of each mobile telephone. As a result, mobile telephone units may be automatically dispensed and billed.

The apparatus comprises a plurality of mobile telephone units within the storage mechanism. The apparatus further comprises a recharging circuit for coupling with each of the plurality of mobile telephone units within the storage mechanism to recharge the mobile telephone units.

A sensing circuit is provided for determining a status condition of selected ones of the mobile telephone units. One sensed status condition is the charged state of the mobile telephone unit. Other sensed status conditions include the mobile telephone number (MID), electronic serial number (ESN), and system identification number (SID) assigned to each telephone unit, repertoire dialing memories, and cumulative and resettable timers.

The input/output circuit comprises an input/output interface coupled to the bus, a credit card reader coupled to the input/output interface, and a keyboard coupled to the input/output interface. The input/output circuit further comprises a printer coupled to the input/output interface for printing a credit card bill charged to a credit card account as read by the credit card reader corresponding to usage of a returned mobile telephone as determined by the microprocesor. The input/output circuit also comprises a video monitor.

The apparatus is used in combination with a central computer station and further comprises a modem circuit to allow the microprocessor to communicate telephonically with the central computer station. The modem circuit communicates through conventional telephonic landlines to the central computer station. In another embodiment, the modem circuit comprises one of the mobile telephone units and the microprocessor communicates through one of the mobile telephone units with the central computer station.

The invention is still further characterized as an apparatus for vending mobile cellular telephones comprising a storage device for storing a plurality of the mobile cellular telephones, a dispensing device and circuit for selectively dispensing one of the plurality of stored mobile cellular telephones, and a receiving device and circuit for receiving a previously dispensed mobile cellular telephone. The receiving circuit interrogates the previously dispensed mobile cellular telephone to determine its identity and usage since it was dispensed. A billing circuit is provided for billing the usage of the returned mobile cellular telephone to a customer determined account number. As a result, mobile telephone services are automatically vended.

The invention is also a method for automatically dispensing mobile cellular telephone services comprising the steps of storing a plurality of mobile cellular telephones, configuring the plurality of mobile cellular telephones so that at least some of the plurality of mobile cellular telephones are ready for operation, and selecting one of the stored mobile cellular telephone in a condition ready for operation is response to a customer demand. The customer demand is associated with a credit card number provided by the customer. Credit approval of the credit card number supplied to the customer is obtained, and the selected mobile cellular telephone is dispensed contingent upon credit approval of the customer supplied credit card number.

The invention can still further be characterized as method of dispensing mobile cellular telephone services comprising the steps of receiving a mobile cellular telephone within a device for storing a plurality of mobile cellular telephones, interrogating the mobile cellular telephone to determine its identity, and computing a bill associated with the mobile cellular telephone which responds to the identity of the mobile cellular telephone.

The invention and its various embodiments may be better visualized by now turning to the following drawings.

DETAILED DESCRIPTION OF THE PREFERRED EMBODIMENTS

Mobile cellular telephone services are automatically vended through a microprocessor controlled vending machine which inventories a plurality of mobile cellular telephones and selectively delivers one of the phones after reading a credit card number from a customer supplied credit card and obtaining credit card approval. The mobile cellular telephone is dispensed and later returned by the customer. When returned by the customer, the mobile cellular telephone is disposed within a receiving unit which uniquely identifies the mobile cellular telephone through its phone number or other identification number, reads the usage made by the customer of the mobile telephones, and senses the charged condition of the battery within the mobile telephone. The customer's credit card may be read again if the charges are to be billed to a different credit card account, and the bill for rental of the mobile cellular telephone unit, including all telephone usage charges, is computed and directly billed to the credit card number. The vending unit then produces a printed record of the credit card billing and returns the mobile telephone unit to inventory to be fully recharged and reinitialized for revending.

Figure 1:
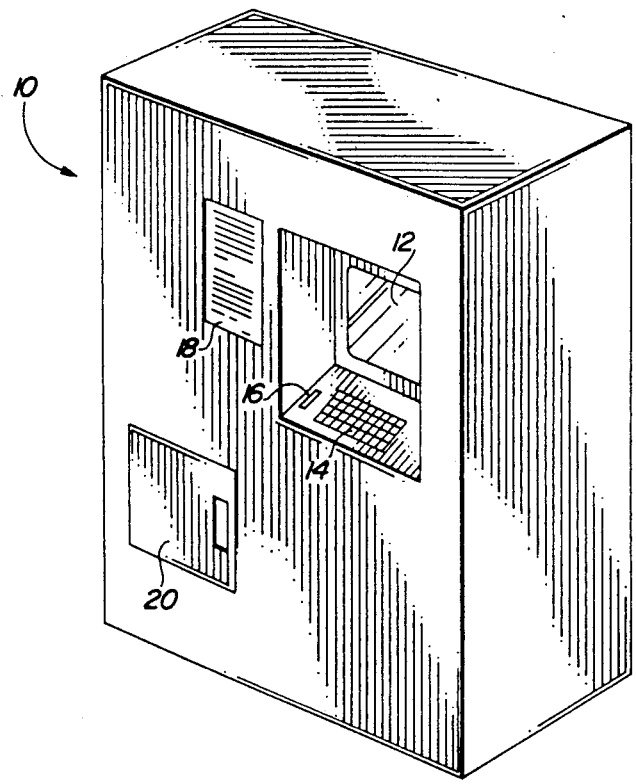
FIG. 1 is a front perspective view of a vending unit incorporating the invention.

FIG. 1 depicts a front perspective view of the vending unit, generally denoted by reference numeral 10, which is comprised of a cabinet, wherein a plurality of mobile or hand-held cellular telephone units are stored in two dimensional array, similar in arrangement to the storing of video cassettes in the prior art video vending units manufactured by Video Vendor of Skokee, Ill. discussed above. To the extent applicable, the Video Vendor's User and Maintenance Manual is herein expressly incorporated by reference. Therefore, the details of the electromechanical mechanism and how it is driven to deliver a selected telephone unit is not further described other than to provide a background to fully illustrate the invention.

Vending unit 10 is comprised of a cabinet accessible through locked doors (not shown). The inventory of phones is generally stored in the left two-thirds of the unit as seen in FIG. 1 with the appropriate electronic circuitry, as described below in connection with FIG. 2, housed within the right portion of unit 10 as shown in FIG. 1.

A monitor 12 is mounted for customer viewing and provides the chief means for communication to the customer. The customer is able to input information into vending unit 10 through a keypad or keyboard 14 in response to prompts on the monitor and through a conventional credit card reader 16. Written operating instructions may be provided in a permanent or semipermanent graphic display 18 attached to the exterior of vending unit 10. A selected telephone unit is delivered through door assembly 20 and returned through the same door assembly.

In the illustrated embodiment, payment for the rental transaction, including a security deposit, is preferably made through a charge to the submitted credit card account. However, it is entirely within the scope of the present invention that check or cash transactions may also be accommodated through the use of bill and coin handlers, or that the transaction may be credited to a customer's home or business telephone account and conditioned upon verification either through a customer entered password, such as driver's license, social security number or the like, or through voice verification from a central office communicated through a modem contained within vending unit 10, as is described in greater detail below.

Figure 2:
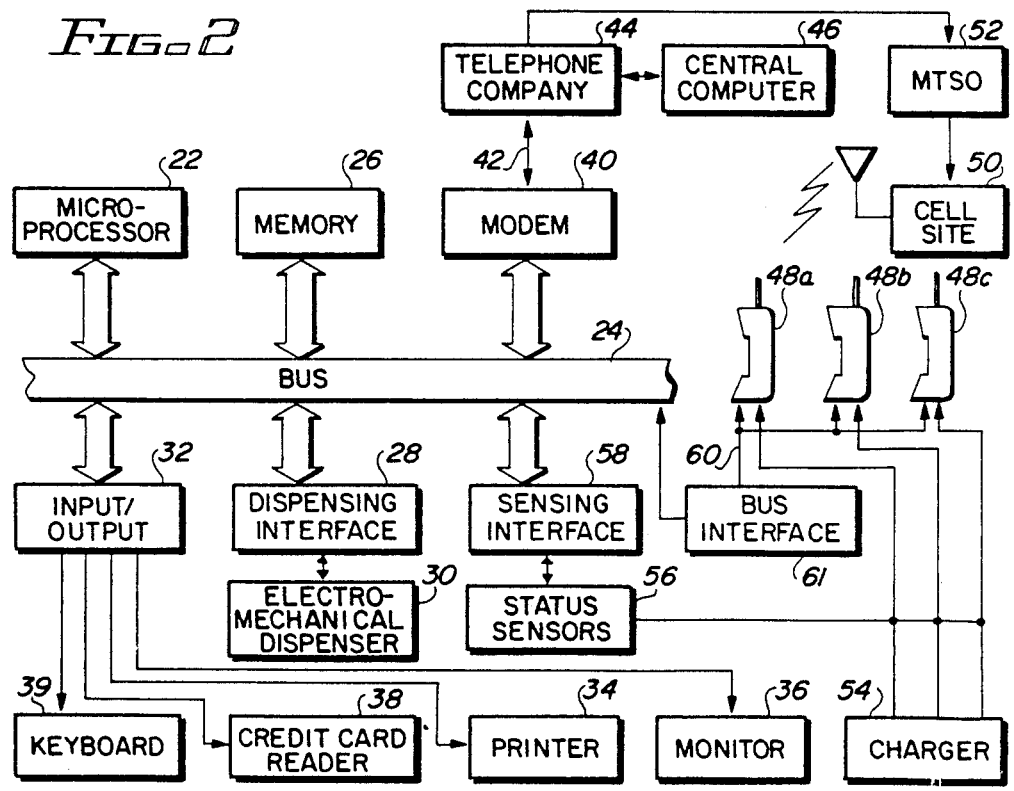
FIG. 2 is a simplified block diagram of a vending unit incorporating the invention.

Turn now to FIG. 2 wherein a simplified block diagram of the circuitry and mechanism contained within vending unit 10 of FIG. 1 is depicted. The vending unit includes a conventional microprocessor 22 bidirectionally coupled through control, address and data buses, collectively denoted by reference numeral 24, to a pluarlity of circuit modules. Included among these circuit modules is a conventional memory module 26 which includes both READ/WRITE memories as well as READ ONLY memories in which programs or other system instructions are contained. Memory 26 also communicates with buses 24.

Buses 24 in turn communicate with a dispensing interface module 28 which provides selective drive information to a electromechanical dispensing unit 30 for positioning an approprite telephone unit within door assembly 20 from a selected inventory position, or returning a delivered telephone unit from door assembly 20 to a selected inventory position. The electromechanical mechanism and control by a microprocessor of retrieval from and insertion into the inventory is conventional, and is generally similar to that utilized in the vending unit of Video Vendor, Skokee, Ill. and as is generally described in the incorporated User and Maintenance Manual.

Also coupled to buses 24 is a plurality of conventional input and output interfaces or modules collectively denoted by reference numeral 32. Input/output modules 32 provide the necessary and appropriate coupling between buses 24 and a hard copy or paper printer 34, a video monitor 36, a keypad 39 and a conventional credit card reader 38. In the illustrated embodiment, monitor 36 includes only a video output device. However, it is expressly contemplated that monitor 36 may also include an audio output speaker and audio input microphone together with appropriate telephonic circuitry to allow voice communication, if necessary, with a remote office, or with microprocessor 22 through voice commands. Output modules 32, printer 34, monitors 36 and credit card reader 38 are each conventional and have previously been incorporated in vending units, such as the Video Vendor of Skokee, Ill., and are further and generally described in the User and Maintenance Manual incorporated herein by reference.

Buses 24 are also coupled to a modem 40 which b connected by conventional telephone landlines 42 to a telephone central office 44 which in turn selectively switches communications with vending unit 10 to a central computer 46. In the illustrated embodiment, credit approvals are automatically provided through central computer office 46 according to information input through credit card reader 38 via modem 40.

Alternatively, modem 40 may be omitted and any one or a selected one of cellular telephones 48a–48c activated to contact the appropriate cell site controller 50 which forms part of a conventional cellular telephone network. Only three telephone units are depicted in the simplified schematic of FIG. 2, but it is expressly understood that any number may be chosen for the inventory size. Telephone calls can thus be made directly from vending unit 10 through one or more of its cellular telephone held in inventory through cell site controller 50, mobile telephone switching office 52 and thence to the telephone central office 44 and central computer 46. Therefore, not only may each cellular telephone 48a–48c be functionally tested before or after it is dispensed, but the opportunity may be taken during such a testing procedure to obtain necessary off-site credit approvals or communications.

Vending unit 10, however, includes several different units not found within prior art dispensers. As each cellular telephone 48a–48 c is placed or maintained within vending unit 10, it is placed within a receiving assembly which is electrically communicated with a battery charger 54. Each mobile cellular telephone unit 48a–48c is conventionally designed with a plurality of external contacts which allow charging of its onboard batter. As each cellular telephone unit 48a–48c is placed within its receiving fixture within vending unit 10, it is electrically communicated with charger 54 to charge the onboard battery within cellular telephone unit 48a–48c. Charger 54 may thus be constituted as desired either to place a quick charge on the onboard battery or to provide a trickle charge, or both. In either case, as will be described below, microprocessor 22 notes when any specific mobile telephone unit 48a–48c is returned and the time of day is stored within memory 26. The time period that a charging voltage is then applied to the returned mobile telephone unit can be measured to insure that it is fully recharged prior to being redispensed.

In addition thereto, a status sensor 56, which may be multiplexed across the terminals of the onboard batteries of mobile telephone units 48a–48c, when they are selectively disconnected from the charger, allows for direct monitoring of the condition of the onboard battery. Status sensors 56 are coupled in turn through an appropriate sensing interface 58 to buses 24. Since the onboard batteries within each telephone unit 48a–48c, when it is returned, may vary dramatically depending upon the degree of use which the customer has made of the unit, each unit may not need the entire recharging time specified for the onboard battery before being fully recharged. Thus, staus sensor 56 will monitor the actual charge condition of each of the onboard batteries to allow a determination to be made within microprocessor 22 when each unit can be returned to the active inventory, thereby increasing inventory turnover.

In the preferred embodiment, mobile telephone units 48a–48c each include a nickel-cadmium battery which is subject to memory phenomena. Memory phenomena refers to the tendency of a nickel-cadmium battery to take less than a full charge after repeated charging cycles, unless completely discharged before recharging. Therefore, microprocessor 22 will fully discharge any remaining charge on the battery of the returned unit before recharging the battery. The sensing of battery charge condition thus is used to control both the discharge/recharge cycle as well as to actually monitor the battery lifetime condition, since the number of effective recharging cycles for any given battery is finite.

In addition thereto, as described in greater detail in the copending application entitled "Cellular Portable Telephone Battery Pack and Programmer Interface", Ser. No. 290,061 filed Dec. 27, 1988, assigned to the same assignee as the present invention, and expressly incorporated herein by reference, the attachable battery back of each mobile cellular telephone unit 48a–48c has been modified or alternatively the mobile telephone itself has been modified to bring a plurality of contact pins to the exterior of the telephone unit to allow selective communication between the onboard bus structure of each telephone unit 48a–48c with buses 24. This bus-to-bus connection is symbolically depicted in FIG. 2 by bidirectional coupling 60 and bus interface unit 61. Bus interface 61 may or may not be required depending on the bus and signal protocol or signal level compatibility of buses 24 and the internal buses in telephones 48a–48c. The function of bus interface unit 61 is to condition signal levels and/or to allow a bus handshake between the two different types of bus systems.

The significance of coupling 60 is that the circuitry of vending unit 10 as well as central computer 46 now becomes integrated electronically with the computer systems contained within each mobile cellular telephone unit 48a–48c. The operation of each telephone unit 48a–48c may thus be selectively, remotely and arbitrarily reprogrammed, or for that matter initially programmed. Moreover, integration of the systems through their respective bus structures allows information stored within each telephone unit, such as total elapsed time of operation or itemized billing particulars, to be communicated to microprocessor 22. As a result, appropriate billing receipts and charges can be computed and delivered.

Still further, the telephone number of which each of the mobile telephone units 48a–48c has been programmed, can be remotely reprogrammed through central computer 46. Thus, if a customer rents a telephone unit in New York which has a New York telephone exchange and then flies to Los Angeles, it may be necessary when he returns the unit in Los Angeles for the dispensing unit in Los Angeles to recognize the New York number in the returned telephone unit 48a–48c and reprogram it with an appropriate Los Angeles telephone exchange. The fact of reprogramming can then be recorded in Los Angeles mobile cellular network and the deletion of and hence new availability of the prior New York telephone number can be communicated to the appropriate central computer office 46 connected to the New York cellular mobile network.

Alternatively, depending on the roaming agreements made between various cellular networks, the New York telephone exchange number may not require reprogramming in order to be used within the Los Angeles cellular network and vice vera. However, it is assumed that most customers will prefer a local telephone exchange on which to receive calls originating in the area from which they obtain the mobile cellular unit. Most user will in any case assume that the telephone they have rented has the area code designation of the locale where it was rented. On the other hand some customers may require and prefer to be assigned an out-of-area area code number to allow them to be contacted by others through their home area code notwithstanding their actual presence in a foreign area code. Still further, the customer will be given the option to arrange for call forwarding to the mobile number of his dispensed unit through instructions given through keyboard 39.

Figure 3:
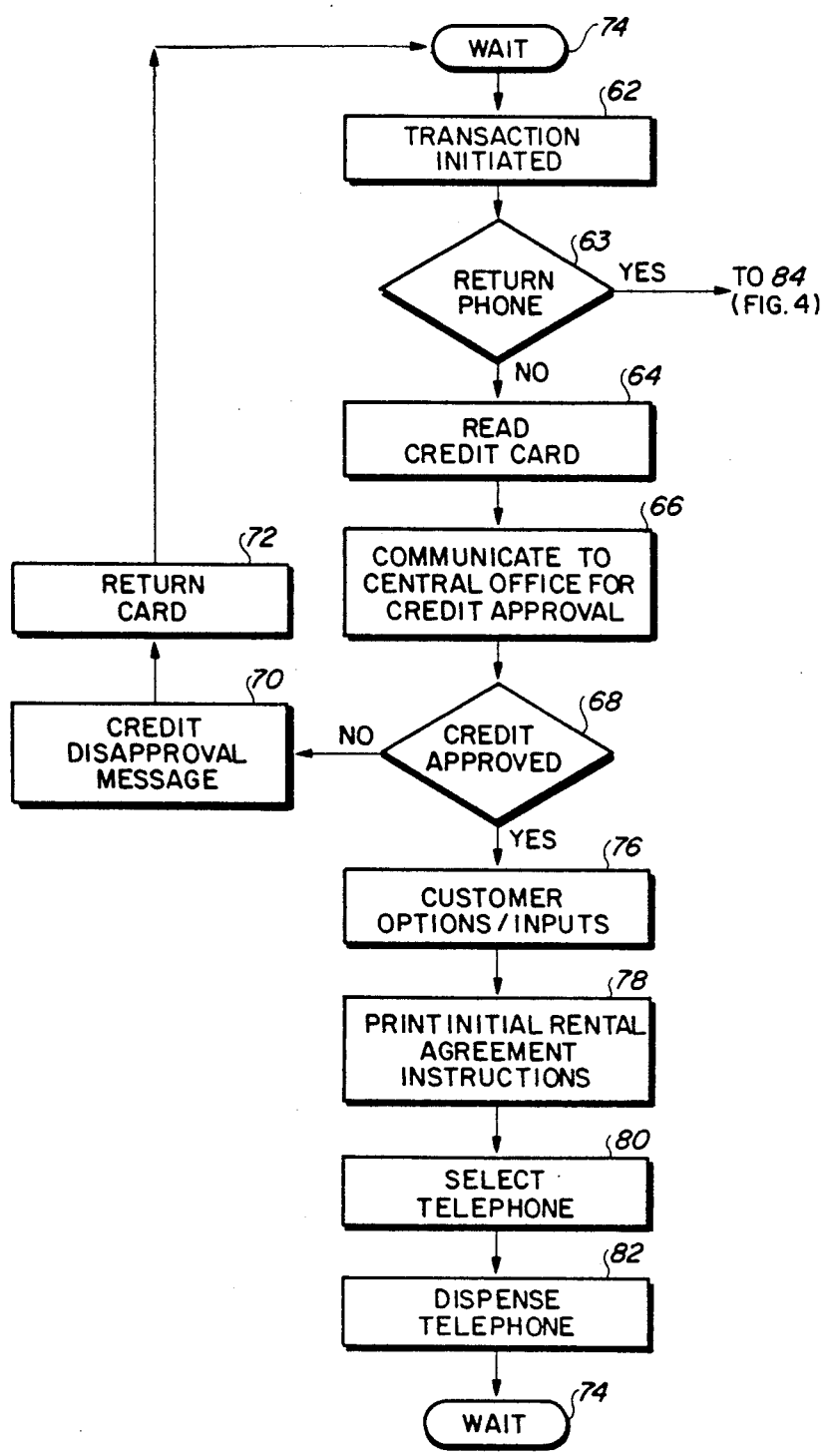
FIG. 3 is a flow chart of the methodology of the invention wherein a telephone is dispensed under a rental agreement.

The various elements of the vending unit 10 having been generally described in the context of the block diagram of FIG. 2, turn now to the operation of the illustrated embodiment as best depicted in the flow diagram of FIG. 3. FIG. 3 illustrates the operation which is implemented when a cellular telephone unit 48a–48c is dispensed.

The transaction is initiated beginning at step 62 by, for example, pushing a selected button on keyboard 39 as directed either by a continuous monitor prompt or by instructions included on graphic display 18. The general terms of the security agreement for renting of the telephone unit together with the rate and terms of the rental can then be displayed on a page-by-page basis if needed on monitor 36.

A determination is then made at step 63 whether the customer desires to rent or return a rented unit. Should the customer then desire to rent a unit, he is prompted to insert his credit card within credit card reader 38. The credit card is read a step 64 after which microprocessor 22 communicates to a central computer 46 at step 66 through modem 40 or through mobile cellular telephone 48a, for example, which is to be dispensed. A determination is then made at step 68 whether or not the inserted credit has been approved. If the credit has not been approved, a credit disapproval message is displayed at step 70 together with other appropriate instructions, the credit card returned at step 72 with programming returning to a wait condition at step 74.

Alternatively, instead of returning credit card 72, if it determines that the credit card is lost, stolen, expired or confiscation is otherwise justified, the card can be retained within vending unit 10 and an appropriate confiscation message displayed upon monitor 36.

However, if credit is approved, the customer may then be queried for various options or inputs at step 76. One such option may be whether the customer requires an instruction sheet to be printed describing the operation of the mobile unit, whether the customer desires an automatic reminder telephone call to recharge the unit with a charger supplied with the mobile unit, whether the customer intends to rent the unit more than twenty-four hours, whether he intends to return it at a dispensing location other than the one from which it was dispensed, or whether the customer desires call forwarding from a customer designated number to the dispensed unit. In such instances insertion of passwords or other security measures may be required, not reflected in FIG. 3, to insure only authorized diversion of telephone communication.

After any particular details unique to the transaction have been input at step 76, an initial rental agreement or instructions may be printed, if desired, at step 78 and delivered through printer 34 to the customer. A fully charged, and pretested telephone, held in inventory, is selected at step 80 and dispensed at step 82. Step 82 also includes internal inventory control steps undertaken to keep track of dispensed units, inventory staus, and customer transaction histories. Vending unit 10 then returns to its WAIT condition at step 74.

Figure 4:
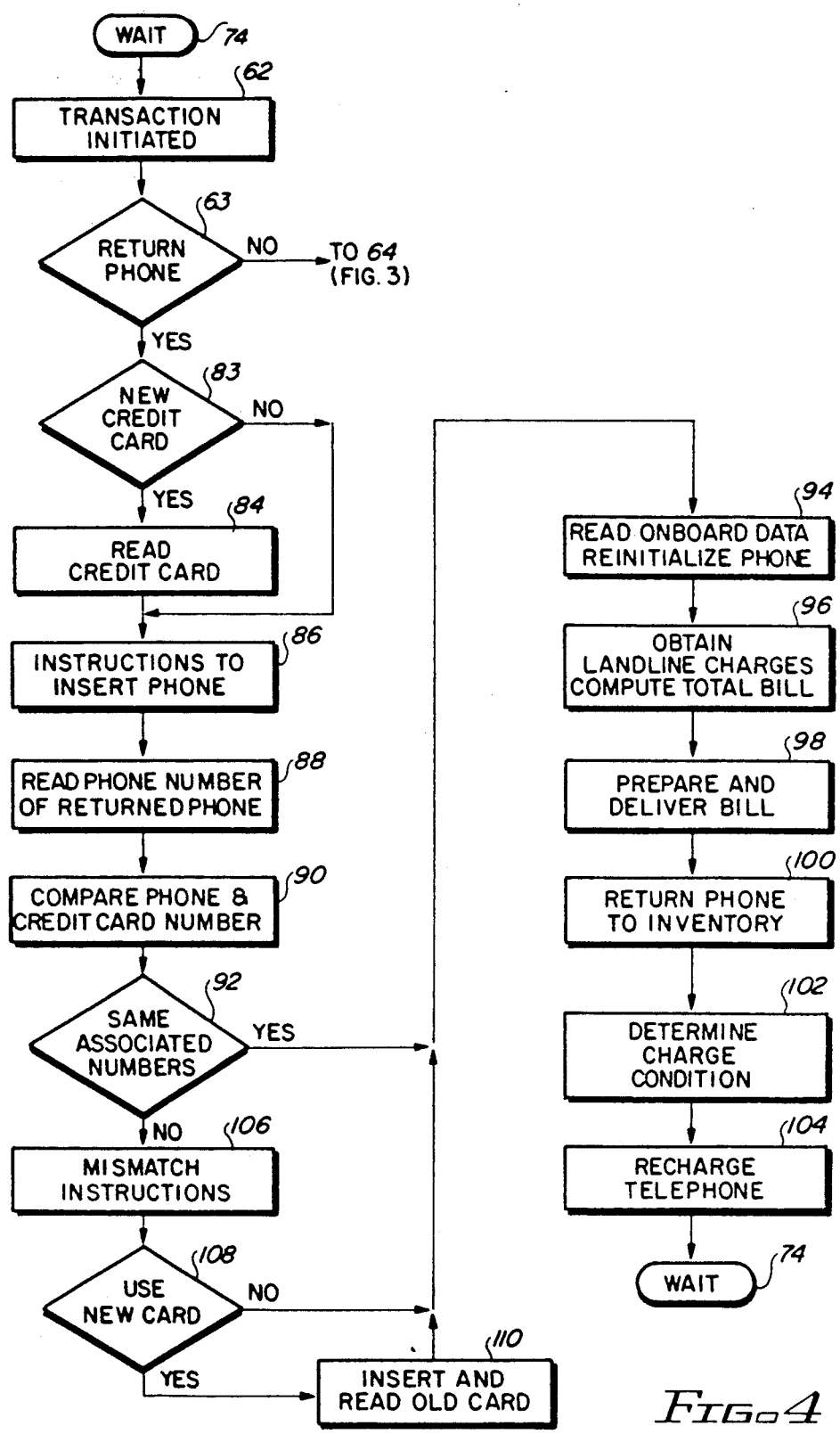
FIG. 4 is a flow chart of the methodology of the invention wherein a telephone is returned, and billing charged under a rental agreement.

FIG. 4 illustrates the operational steps which are performed by vending unit 10 when the telephone is returned by the customer and the final billing generated. Once again, vending unit 10 begins from its WAIT condition at step 74. The transaction is initiated as before at the step 62 by pressing a button on keyboard 39. Again, as before, a prompt occurs on monitor 36 which, among other things, inquires whether or not the customer is desiring to return a phone or to obtain a phone. If the customer is returning a phone, he is prompted at step 83 through monitor 36 whether to insert his credit card at step 84 or simply charge the rental costs to the initially entered credit card account.

Instructions are then displayed on monitor 36 to insert the phone within door assembly 20 at step 86. The customer then inserts the phone within the door assembly which causes the phone ultimately to be connected to charge 54 and immediately to bus connector 60. Confirmation can be made at this time to the customer whether or not the phone is properly reinserted into the vending unit. Microprocessor 22 reads the phone number of the returned mobile telephone 48a, for example, through bus connector 60 at step 88. The selected credit card number and the phone number read at step 88 may then be compared within microprocessor 22 from a corresponding earlier data entry within memory 26. If the same credit card was used to rent the same telephone from the same vending unit 10 at a prior time, the transaction may continue as determined at step 92 within the reading of the onboard data within telephone 48a at step 94. Typically, this data includes the total elapsed time in which the phone was used for which a mobile network access charge may be determined. Associated landline costs will be either directly charged to the customer's telephone number, which was initially entered when the telephone was rented at step 76, or landline charges will be obtained for modem 40 or an operative cellular telephone 48a–48c from central computer 46, communicated to microprocessor 22, stored within memory 26 and appropriately charged to the customer's credit card account at the time of returning the mobile unit to vending unit 10 as performed at step 96.

Alternatively, each mobile telephone unit 48a–48c may have restricted area dialing and associated landline costs recovered in a flat fee computed based on air time, or charged directly to the customer through operator billing or telephone credit-card billing.

The credit card bill is then computed and printed in appropriate format through printer 34 by the microprocessor 22 at step 98 and delivered by vending unit 10 to the customer. The returned phone is returned from door assembly 20 to a position within inventory at step 100, the time or return noted at step 102 and unit recharging begun at step 104.

Telephone 48a is reinitialized, if necessary, by reinitializing the onboard memories at step 94 and, if necessary, as determined through programmed control and communication with central office 46, reassigned at new telephone number.

It is also possible that the vendor of the telephones may have purchased a block of mobile numbers which are less than the number of portable telephones 48a–48c which he has within his vendable inventory. In such a case, the mobile telephone number from one telephone unit at one vending location may be remotely reassigned to a nonassigned telephone unit at another vending site where the number is needed. In addition it is possible that the vendor may have an agreement with the local cellular network carrier to temporarily rent mobile numbers in cases of high temporaty demand. All these types of transactions and mobile number assignments could be carried out automatically through vending unit 10 and central computer station 46.

If, however, at step 92 the credit card number to be charged is not the originally corresponding number when the telephone unit was orginally rented, the fact of the mismatch is noticed on an appropriate prompt on monitor 36 at step 106. The customer is then given the option of charging the cost to the new credit card number associated with the rented telephone number or to substitute the prior credit card which is then read as determined at step 108 at step 110. This will allow the selective use of a new credit card by the customer or will allow a different customer using his own card to return a phone originally rented by another customer.

Thereafter, processing of the returned telephone continues as previously described above.

In the presently illustrated embodiment only the elapsed time is recorded within each mobile cellular telephone unit 48a–48c by onboard circuitry. However, it is expressly contemplated that future telephone units may keep a detailed time and usage log which can then be read out an presented as an itemized bill through printer 34. Alternatively, the telephone usage record of each mobile cellular unit 48a–48c is recorded through the mobile network and telephone exchange in central computer 46. Microprocessor 22 may therefore communicate with central computer 46 to obtain its particularized usage record including time, date, number called, duration of each call, and charge for each call including the mobile cellular fee, which data is communicated to microprocessor 22 for temporary storage within memory 26 and presentation within an appropriately formatted bill delivered to the customer through printer 34. The charge, when the unit is returned, is thus fixed and may be stored within vending unit 10 or more appropriately communicated to central computer 46 for billing to the credit card company. In any case, microprocessor 22 communicates with the return of each cellular unit 48a–48c prior to its being redispensed to terminate the billing associated with the cellular unit to a corresponding credit card and to reinitialize within the bill accounting system of central computer 46 a new accounting assigned to the specifically identified mobile cellular unit.

Many modifications and alternations may be made by those having ordinary skill in the art without departing from the spirit and scope of the invention. Therefore, it must be expressly understood that the illustrated embodiment has been shown only for the purposes for example and should not be read as limiting the invention as defined in the following claims.

For example, vending 10 keep track of its dispensed and stored inventory so that the whereabouts of each telephone unit 48a–48c is tracked. Vending 10 can thus report to a designated remote station when its inventory is depleted, when excess units are being returned, and when a defective unit is identified. In each case an appropriate service or trouble call is automatically made by vending unit 10 or made in response to a polling call from a remote station.

We claim:

1. An apparatus for vending mobile telephones that include memory capability comprising:
    a microprocessor;
    a bus coupled to said microprocessor;
    a memory coupled to said microprocessor;
    storage means for holding a plurality of mobile telephone units;
    dispensing means for selectively dispensing one of said plurality of mobile telephone units from said storage means, said dispensing means being electrically coupled to said bus and thence to said microprocessor memory;
    input/output means coupled to said bus for communicating with said microprocessor with interactive communication with said microprocessor for selective control of said dispensing means; and
    bus connection means for electrically coupling through said plurality of mobile telephone units within said storage means, said bus connection means coupled to said bus for allowing selective communication between the memory of each of said plurality of mobile telephone units and said microprocessor to determine the identity and usage of each mobile telephone,
    whereby mobile telephone units are automatically dispensed and billed.

2. The apparatus of claim 1 further comprising a plurality of mobile telephone units within said storage means.

3. The apparatus of claim 1 further comprising recharging means for coupling with each of said plurality of mobile telephone units within said storage means to recharge said mobile telephone units.

4. Sensing means for determining a status condition of selected ones of said mobile telephone units.

5. The apparatus of claim 4 wherein said status condition is the charged state of said mobile telephone unit.

6. The apparatus of claim 1 wherein said input/output means comprises an input/output interface coupled to said bus, a credit card reader coupled to said input/output interface, and a keyboard coupled to said input/output interface.

7. The apparatus of claim 6 wherein said input/output means further comprises a printer coupled to said input/output interface for printing a credit card bill charged to a credit card account as read by said credit card reader corresponding to usage of a returned mobile telephone as determined by said microprocessor.

8. The apparatus of claim 1 wherein said input/output means comprises a video monitor.

9. The apparatus of claim 1 being used in combination with a central computer station and further comprising a modem means for communicating said microprocessor telephonically to said central computer station.

10. The apparatus of claim 9 wherein said modem means communicates through conventional telephonic landlines to said central computer station.

11. The apparatus of claim 9 wherein said modem means comprises one of said mobile telephone units and wherein said microprocessor communicates through said one mobile telephone unit with said central computer station.

12. An apparatus for vending mobile cellular telephones that include memory capability comprising:
    storage means for storing a plurality of said mobile cellular telephones;
    dispensing means for selectively dispensing one of said plurality of stored mobile cellular telephones;
    receiving means for receiving a previously dispensed mobile cellular telephone, said receiving means interrogating the memory of said previously dispensed mobile cellular telephone to determine its identity and call time usage since being dispensed; and
    billing means for billing usage of said returned mobile cellular telephone to a customer determined account number,
    whereby mobile telephone services are automatically vended.

13. The apparatus of claim 12 wherein said apparatus is used in combination with a central computer office which records all communication activities from each of said mobile cellular telephones, said apparatus further comprising communication means for selectively communicating with said central computer office in response to commands generated by said receiving means, said receiving means generating said commands in response to determination of said identity of said mobile telephone unit returned to said apparatus.

14. The apparatus of claim 13 wherein said billing means is coupled to said communication means and communicates through said communication means with said central computer office to obtain said record of communication from said returned one of said plurality of mobile cellular telephones and to compute a charge to said billing number in response to said record.

15. The apparatus of claim 12 wherein said billing means further prints a billing record of charges to said customer predetermined account number and delivers said billing record to said customer.

16. The apparatus of claim 14 wherein said billing means further prints a billing record of charges to said customers predetermined accound number and delivers said billing record to said customer.

17. A method for automatically dispensing mobile cellular telephone services comprising the steps of:
    storing a plurality of mobile cellular telephones;
    configuring said plurality of mobile cellular telephones to verify that at least some of said plurality of mobile cellular telephones are ready for operation;
    selecting one of said stored mobile cellular telephones in a condition ready for operation in response to a customer demand;
    associating said customer demand with a credit card number provided by said customer;
    obtaining credit approval of said credit card number supplied to said customer; and
    dispensing said selected mobile cellular telephone contingent upon credit approval of said customer supplied credit card number.

18. The method of claim 17 further comprising the steps of:
    receiving a mobile cellular telephone within a means for storing a plurality of mobile cellular telephones;
    interrogating said mobile cellular telephone to determine its identity; and
    computing a bill associated with said mobile cellular telephone which responds to said identify of said mobile cellular telephone.

* * * * *